Dec. 29, 1959 — L. L. TAYLOR ET AL — 2,919,350
INFRARED RANGING SYSTEM
Filed Dec. 13, 1957 — 2 Sheets-Sheet 1

INVENTORS
LOUIS L. TAYLOR
RICHARD M. HODGE
BY
ATTORNEY

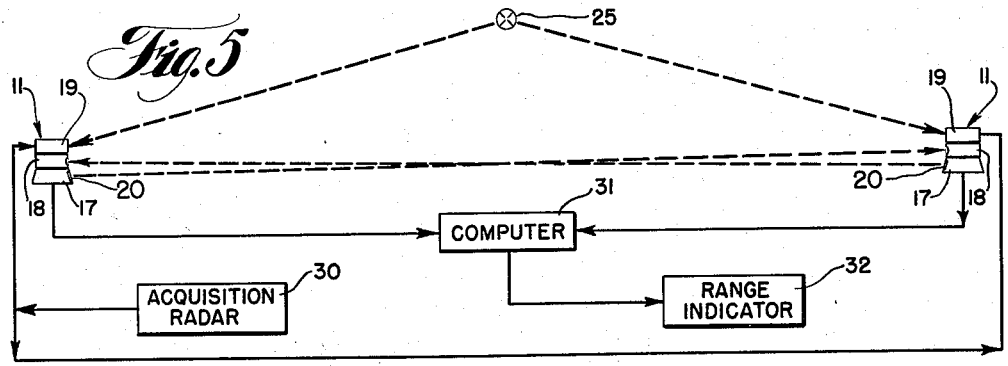
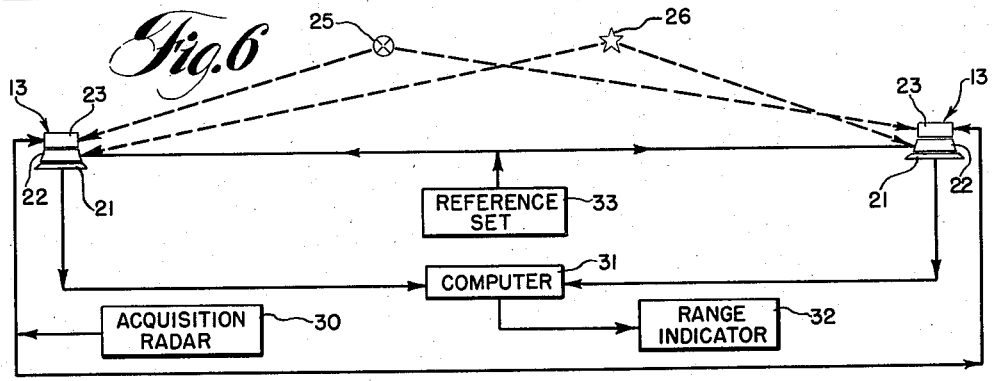
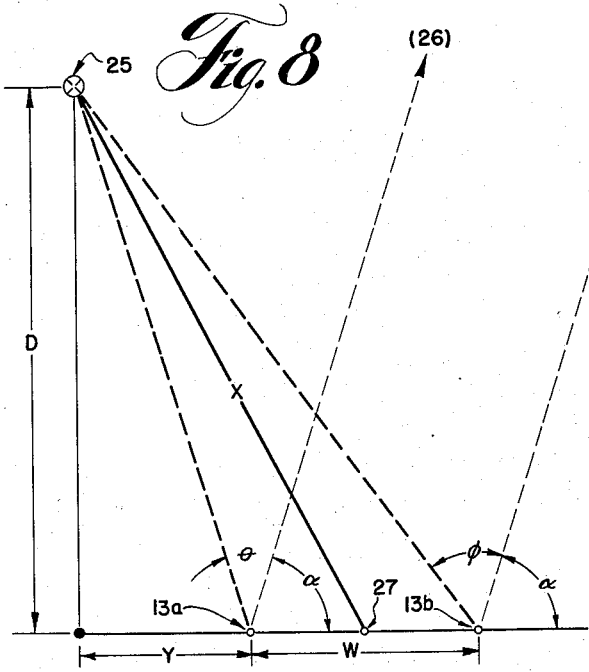
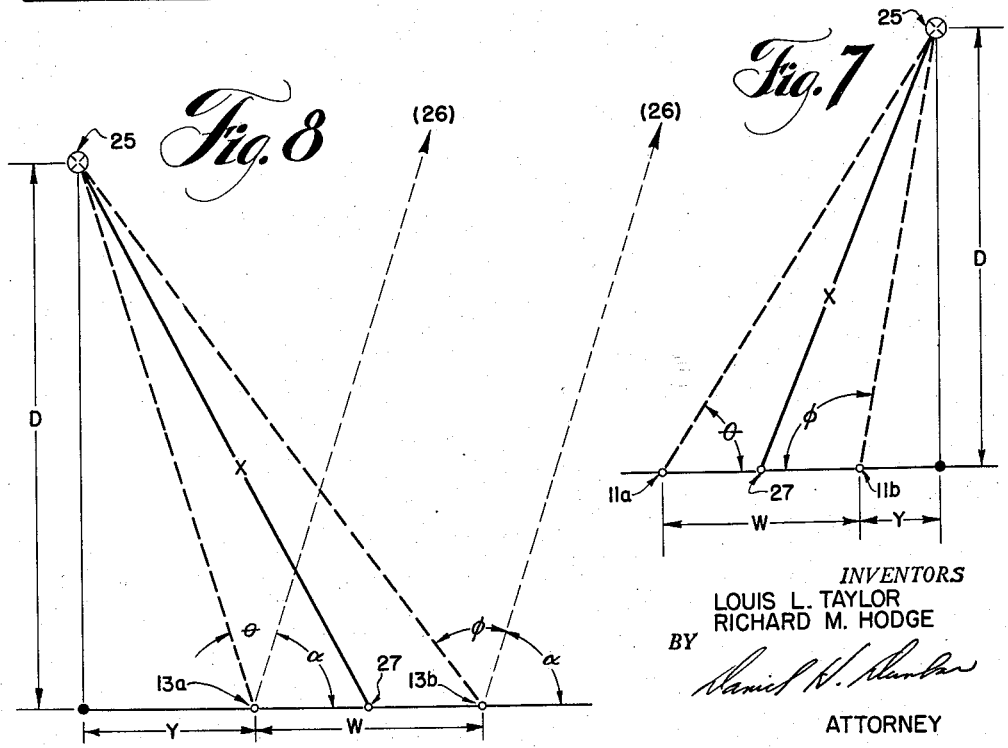
INVENTORS
LOUIS L. TAYLOR
RICHARD M. HODGE
BY
ATTORNEY United States Patent Office

2,919,350
Patented Dec. 29, 1959

2,919,350

INFRARED RANGING SYSTEM

Louis L. Taylor, Granville, and Richard M. Hodge, Westerville, Ohio, assignors to North American Aviation, Inc.

Application December 13, 1957, Serial No. 702,712

10 Claims. (Cl. 250—83.3)

This invention relates generally to an infrared ranging system and more particularly to an improved infrared ranging system which is capable of providing accurate range information. Also, the ranging system of this invention is especially well-suited for aircraft applications and for applications wherein the individual equipments utilized must be comparatively mobile.

Range determination inaccuracies have sometimes been noted with respect to heretofore known infrared ranging systems which utilize triangulation principles, and such inaccuracies have been particularly emphasized in ranging efforts associated with the determination of long distances. In many instances the cause for such inaccuracies is sourced in the use of a comparatively short reference or base line for triangulation purposes in combination with relatively inaccurate angular measurements. Utilization of infrared range equipments in aircraft applications has heretofore proved difficult in that distantly separated portions of the aircraft airframe, which serve as supporting platforms for system detector units, are relatively unstable and during flight, flexural stresses in the aircraft structure cause individual units of a paired infrared detector arrangement to become improperly oriented with respect to each other thus sourcing inaccurate angular information.

To overcome such deficiencies in infrared ranging systems, this invention contemplates a novel arrangement for synchronizing the individual detector units of a paired detector unit installation. Such synchronization is essentially accomplished through use of either a local point source reference, or a distant point source reference, in combination with paired dual detector units and other suitable equipment components.

It is an object of this invention to provide an aircraft infrared ranging system which can be utilized to make relatively accurate long distance range determinations as compared with known aircraft infrared ranging equipments.

Another object of this invention is to provide an infrared ranging system which may be made to function effectively through employing a relatively short base or reference line for triangulation purposes.

Another object of this invention is to provide an infrared ranging system which may be utilized with aircraft configurations which would otherwise prohibit installation of a passive, triangulation type, infrared ranging system.

A still further object of this invention is to provide an infrared ranging system which may be utilized in aircraft in which flexural distortion of system platform portions of the aircraft are encountered during either routine or high-performance flight operations.

Another object of this invention is to provide an infrared ranging system which utilizes paired dual detector units properly synchronized with respect to each other.

Another object of this invention is to provide an infrared ranging system which utilizes either locally or distantly located point sources in fulfillment of a synchronization function.

Another object of this invention is to provide an infrared ranging system wherein the individual components may be readily moved from place to place and relative to each other without unduly restricting the capability of the system.

A still further object of our invention is to utilize commercially available and known components, optics, circuitry, computers, and other equipments therein.

Other objects and advantages of this invention will become more apparent during consideration of the drawings and detailed description portions of this application.

In the drawings, wherein like numerals are utilized to reference like components throughout the same:

Fig. 5 is a block diagram of the form of infrared ranging system of this invention which may be utilized with the aircraft of Fig. 1;

Fig. 6 is a block diagram of the form of infrared ranging system of this invention which may be utilized with the aircraft of Fig. 2; and Figs. 7 and 8 schematically illustrate the triangulation principles associated with the forms of infrared ranging system illustrated schematically in Figs. 5 and 6 respectively.

Figure 1:
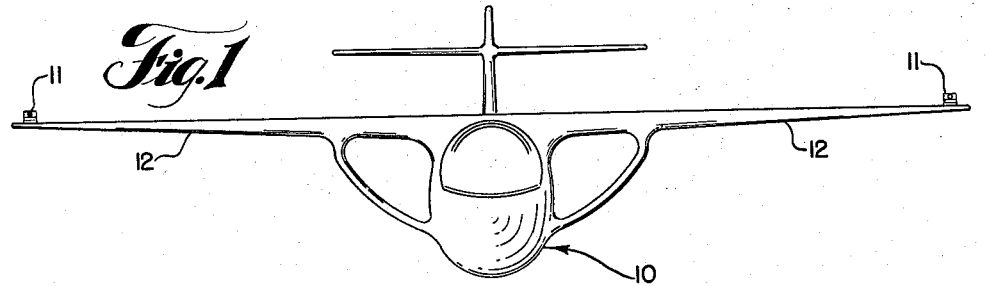
Fig. 1 is a front elevation of an airplane showing portions of one embodiment of the infrared ranging system of this invention in their mounted relation with respect thereto.

In Fig. 1 there is illustrated an airplane 10 having a dual detector unit 11 mounted at the extreme portion of each of its wing members 12. As noted in this illustration, detector units 11 are mounted in viewing relation to each other and structural portions of airplane 10 do not interfere with the establishment of that relationship. Each detector unit 11 is located with its vertical axis at the terminal point of the base line which is established for use in the application of triangulation principles to range determining efforts for the system of our invention.

Figure 2:
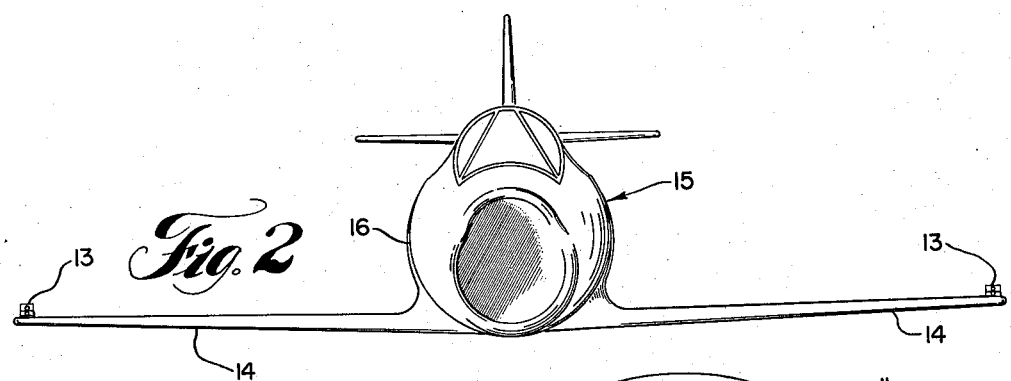
Fig. 2 is a front elevation of another form of aircraft showing portions of an alternate embodiment of the infrared ranging system of our invention in their mounted relation with respect thereto.

An alternate arrangement is shown in Fig. 2 wherein dual detector units 13 are mounted at the extremes of each wing member 14 of airplane 15. The configuration of airplane 15 is such that fuselage portion 16 thereof prevents detector units 13 from being mounted in viewing relation relative to each other. Again, the vertical axis of each of detector units 13 defines a terminal point of a base line established for use in conjunction with the application of triangulation principles during range determining efforts of this invention.

Detector units 11 of Fig. 1 utilize local point source references to accomplish synchronization of such units with respect to each other, whereas the detector units 13 shown in Fig. 2 utilize a distant point source in accomplishing the tie-in synchronization feature. It should be noted that the wing members 12 of airplane 10, or wing members 14 of airplane 15, are generally comparatively flexible relative to their respective aircraft fuselages and relative to each other. Distortions in wing position caused during flight have heretofore introduced serious error in the ranging result established from the use of known infrared ranging systems.

Figure 3:
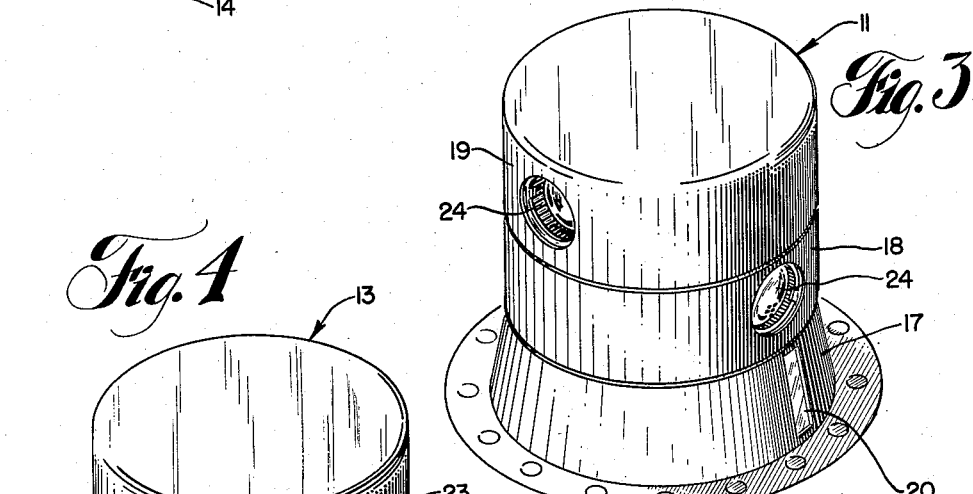
Fig. 3 is a perspective view of one form of dual detector unit which may be utilized in the ranging system of this invention and the use of which is illustrated in Fig. 1.

A dual detector unit 11 is shown in greater detail in Fig. 3, and it is preferably comprised of a base portion 17 which may be attached to the wing structure of an airplane or to some other support platform, a reference detector 18 which is rotatable relative to the base member 17, and a target infrared detector 19 which is rotatable relative to each base 17 and detector 18. The base portion 17 contains therein a fixed point source reference 20 which may take the form of means emitting infrared energy, visible light, or the like.

Figure 4:
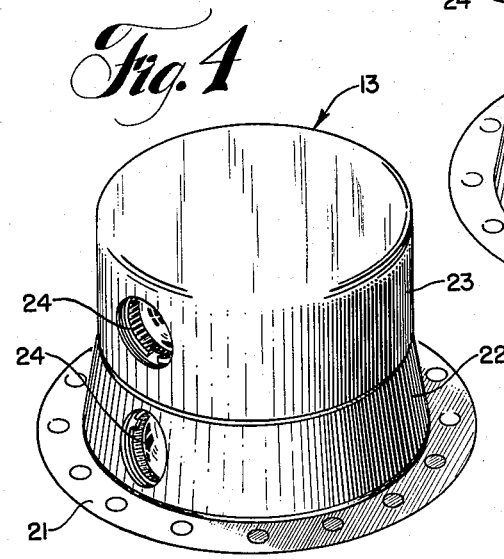
Fig. 4 is a perspective view of an alternate form of dual detector unit which may be utilized in the ranging system of this invention and the use of which is illustrated in Fig. 2.

Dual detector unit 13 (Fig. 4) is comprised of a base portion 21, a reference detector 22 which is rotatable with respect thereto, and a target detector 23 which is rotatable relative to each the base 21 and the reference detector 22. Base 21, like base 17, is a form which permits attachment of the detector unit to an aircraft wing or to some other support member. In either the Fig. 3 or Fig. 4 arrangement, the relative position of the reference detector and the target detector may be interchanged without adversely affecting operation of the arranging system of this invention.

Detailed construction of each of the hereinbefore mentioned detectors is not illustrated by the drawings. However, their features are well-known and basically each detector is provided with means for gathering infrared radiation and converting that gathered radiation to a low level electrical signal. Each detector unit is also provided with means for driving or rotating the unit in tracking relation to a specified target source of infrared energy or a point source reference. Component parts for each detector typically includes protecting infrared domes, filters to screen out unwanted energy radiation, optical means for gathering and focusing received and filtered infrared radiation, thermal or photoconductor detector elements for converting the so-received infrared energy to an electrical signal, electrical signal amplifiers, comparator circuits, and servo motor means for directionally rotating the detector in its tracking or homing function.

Each of dual detector units 11 and 13 is provided with means for generating or emitting an electrical signal or the like which is indicative of the angular position of the target detector portion thereof relative to the position of its associated reference detector. Potentiometer type devices, synchros, or the like, may be utilized for this purpose. It should be pointed out that in the constructions of each of Figs. 3 and 4, energy from the target or reference source is received into the several detector units through the openings designated generally by the numeral 24. Rotation of each detector unit in its tracking phase of operation causes rotation of the filter, optics, and detector element components associated therewith.

Utilization of dual detector units 11 and 13 with other components of our system is illustrated schematically in Figs. 5 and 6 respectively. In each instance, infrared energy of a peak wave length issues from a distantly located target source 25 and is directed to each target detector 19 of each dual detector unit 11 of Fig. 5, or to each target detector 23 of the dual detector units 13 shown in Fig. 6.

Referring to Fig. 5, simultaneously therewith reference source energy (infrared, visible light, or the like) is transmitted from the source 20 of each dual detector 11 to the reference detector portion 18 of the opposed dual detector unit. Through use of its tracking components, each reference detector 18 will continuously track or hunt the point source 20 provided in the base portion 17 of its opposed dual detector unit. Likewise, each target detector 19 will, through the use of like tracking means components, track or hunt the distantly located target 25. Heavy dashed lines are utilized in Fig. 5 to indicate schematically the path that the radiated energy travels from the target or reference source to the properly associated detector.

Referring to Fig. 6, a distant celestial body 26 provides the reference point source for synchronization purposes. As with the Fig. 5 arrangement, each reference detector 22, through utilization of its tracking devices and servo motor, follows or tracks the source 26 continuously. Likewise, detectors 23 track the target 25 even though the incorporating aircraft 15 re-orients itself with respect thereto, or even should wing members 14 be flexed relative to each other.

The triangulation principles utilized in the Fig. 5 system are illustrated in Fig. 7, and as there shown dual detector units 11a and 11b are separated by a fixed predetermined distance W which approximates the wing span of the incorporating aircraft. It is required that the distance X from target 25 to the point designated 27 (and which lies approximately half-way intermediate detector units 11a and 11b) be determined. The trigonometric solution, utilizing triangulation principles, may be substantially as follows:

(1) $$\tan \theta = \frac{D}{W+Y}$$

or (2) $$W+Y = \frac{D}{\tan \theta}$$

and (3) $$\tan (180° - \phi) = \frac{D}{Y}$$

or (4) $$Y = \frac{D}{\tan (180° - \phi)}$$

Since $W = (W+Y) - Y$ (5) $$W = \frac{D}{\tan \phi} - \frac{D}{\tan (180° - \theta)}$$

Solving D and simplifying the equation:

(6) $$D = \frac{W \sin \theta \sin \phi}{\sin (\theta + \phi)}$$

From Fig. 7:

(7) $$\frac{D}{X} = \sin \left( \frac{\theta + 180° - \phi}{2} \right)$$

or (8) $$X = \frac{D}{\sin \left( \frac{\phi + 180° - \phi}{2} \right)}$$

Substituting for D from Equation 6:

(9) $$X = \frac{W \sin \theta \sin \phi}{\sin (\theta + \phi) \left( \frac{\sin \theta + 180° - \phi}{2} \right)}$$

or

(10) $$X = \frac{W \sin \theta \sin \phi}{\sin (\theta + \phi) \cos \left( \frac{\theta - \phi}{2} \right)}$$

As will be noted therefrom, the distance X may be determined with knowledge of the fixed distance W between the dual detector units 11a and 11b and the angular displacements $\theta$ and $\phi$ which are indicated by the angular position of the target detector of each dual unit relative to its associated reference detector. Such angular values may be measured very accurately and proper magnitude signals transmitted from each of dual detector units 11a and 11b to a computer 31 for further utilization as will hereinafter be described.

The triangulation principles in the Fig. 6 system are illustrated in Fig. 8 and as illustrated therein, dual detector units 13a and 13b are separated by a fixed known distance W which approaches in magnitude the wing span of the incorporating aircraft. It is required that the distance X from target 25 to the point designated as 27 (and which lies approximately half-way intermediate unit 13a and unit 13b) be determined. For analysis purposes, the directional lines extending between each of detector units 13a and 13b to the distantly located reference point source 26 are considered as being parallel because of the infinitely large distance involved. The triangulation relationships utilized in the system of this embodiment are as follows:

(11) $$\tan(180° - \alpha - \theta) = \frac{D}{Y}$$

or

(12) $$Y = \frac{D}{\tan(180° - \alpha - \theta)}$$

and

(13) $$\tan(180° - \alpha - \phi) = \frac{D}{W+Y}$$

or

(14) $$W + Y = \frac{D}{\tan(180° - \alpha - \phi)}$$

Since $W = (W+Y) - Y$

(15) $$W = \frac{D}{\tan(180° - \alpha - \phi)} - \frac{D}{\tan(180° - \alpha - \theta)}$$

Solving for D and simplifying the equation:

(16) $$D = \frac{W \sin(\alpha+\theta)(\alpha+\phi)}{\sin(\phi-\theta)}$$

From Fig. 8:

(17) $$\frac{D}{X} = \frac{\sin(\theta+\phi+2\alpha)}{2}$$

(18) $$X = \frac{D}{\sin\left(\frac{\theta+\phi+2\alpha}{2}\right)}$$

Substituting for D from Equation 16:

(19) $$X = \frac{W \sin(\alpha+\theta) \sin(\alpha+\phi)}{\sin\left(\frac{\theta+\phi+2\alpha}{2}\right) \sin(\phi-\theta)}$$

Operations of the Fig. 5 system may preferably be as follows. Acquisition radar 30, if available, can be utilized to initially orient each of target detectors 19 properly with respect to target 25. Such radar equipment may be readily made to function so as to directionally control rotational movement of each detector about its vertical axis through directional control of its servo motor driving device. After detectors 19 are initially oriented toward target 25, control thereover through radar equipment 30 may be relinquished, and the detectors 19 thereafter will continue to track target 25 through use of their integrally provided tracking mechanisms. Simultaneously, detectors 18 continuously track the source 20 contained in the fixed base portion 17 of the opposed dual detector unit. Signal information having a magnitude which varies as does the magnitude of the angles $\theta$ and $\phi$ of Fig. 7, and which is indicative of the true angular displacement of the lines from each detector unit 11 to target 25 relative to the base line whose terminal points are defined by each of dual detector units 11, is transmitted by appropriate means from each detector unit 11 to computer 31. The W information of Fig. 7 may be previously incorporated into the program arrangement of computer 31 and is properly combined thereby with the aforesaid $\theta$ and $\phi$ signal information to produce an output value which is indicative of the magnitude of the distance X. Such X xalue may be subsequently manifested by the range indicator 32 to visually display the finally required information.

In the Fig. 6 system, the operation of detectors 23 and radar equipment 30 is similar to that described above. Also, the differential angle signals $\theta$ and $\phi$ are combined in computer 31 with previously provided W information to thereby produce a range signal having a value proportional to the actual distance X. The system of Fig. 6 may additionally utilize a reference set unit 33 to place the detectors 22 on the reference source 26 when operation of the system is initiated.

Thus, it is to be noted that even though angular distortion should occur with respect to the platforms which support each dual detector unit, accurate information pertinent to the positioning of the target relative to the triangulation base line is transmitted to the computer for use therein.

Also, the system of this invention may be utilized in ground-based applications and it is required only that the distance intermediate the dual detector units be made to correspond to the W information input into the system computer unit. Angular placement variations necessitated by terrain features and the like can be compensated for through use of the above described synchronized dual tracking detector unit arrangement.

It is to be understood that the form of the invention herein shown and described is to be taken as a preferred embodiment of the same, but that various changes in the shape and size of parts may be resorted to without departing from the spirit of the invention or the scope of the subjoined claims.

We claim:

1. An infrared ranging system utilizing triangulation angular displacement information in a computer unit and comprising a first dual detector unit, a second dual detector unit positioned a known distance from said first dual detector unit, and means transmitting angular displacement signal information from each said dual detector unit to said computer unit, the signal information received by said computer unit from each said dual detector unit being indicative of the angular displacement of a line defined by that detector unit and a target which emits radiant energy relative to a line defined by that dual detector unit and a reference point which emits radiant energy.

2. An infrared ranging device utilizing triangulation displacement information in a computer unit and comprising a first dual detector unit having a target detector portion tracking an infrared target and a reference detector portion tracking a relatively movable reference point energy source, a second dual detector unit positioned in known distance from said first dual detector unit and having a target detector portion tracking said infrared target and a reference detector portion tracking a relatively movable reference point energy source, and means transmitting angular displacement signal information from each said dual detector unit to said computer unit, the signal information received by said computer unit from each said dual detector unit being indicative of the angular displacement of the target detector portion thereof relative to the reference detector portion thereof.

3. The infrared ranging system defined in claim 2 wherein the reference point energy source tracked by the first dual detector unit reference detector portion is movably fixed relative to said second dual detector unit, and wherein the reference point energy source tracked by the second dual detector unit reference detector portion is movably fixed relative to said first dual detector unit.

4. The infrared ranging system defined in claim 2 herein the reference point energy sources tracked by the first dual detector unit reference detector portion and the second dual detector unit reference detector portion are positioned an infinite distance from said first and second dual detector unit reference detector portions.

5. The infrared ranging system defined in claim 2 wherein the reference point energy source tracked by the first dual detector unit reference detector portion corresponds to the reference point energy source tracked by the second dual detector unit reference detector portion, and wherein said reference point energy source is positioned an infinite distance from said first and second dual detector unit reference detector portions.

6. An aircraft infrared ranging system utilizing triangulation angular displacement information in a computer unit and comprising a first dual detector unit mounted on an airplane, a second dual detector unit mounted on said airplane a known distance from said first dual detector unit, and means transmitting angular displacement information from each of said dual detector units to said computer unit, the signal information received by said computer from each said dual detector unit being indicative of the angular displacement of a line defined by that dual detector unit and a target which emits radiant energy relative to a line defined by that dual detector unit and a reference source which emits radiant energy.

7. An aircraft infrared ranging sytem utilizing triangulation angular displacement information in a computer unit and comprising: a first dual detector unit mounted on an aircraft wing member and having a target detector portion tracking an infrared target and a reference detector portion tracking a relatively movable reference point energy source; a second dual detector unit mounted on a wing member of said airplane a known distance from said first dual detector unit and having a target detector portion tracking said infrared target and a reference detector portion tracking a relatively movable reference point energy source; and means transmitting angular displacement information from each of said dual detector units to said computer unit; the signal information received by said computer unit from said first dual detector unit being indicative of the angular displacement of the target detector portion thereof relative to the reference detector portion thereof, and the signal information received by said computer unit from second dual detector unit being indicative of the angular displacement of the target detector portion thereof relative to the reference detector portion thereof.

8. The infrared ranging system defined in claim 7 wherein the reference point energy source tracked by the first dual detector unit reference detector portion is carried by said second dual detector unit, and wherein the reference point energy source tracked by the second dual detector unit reference detector portion is carried by said first dual detector unit.

9. The infrared ranging system defined in claim 7 wherein the reference point energy source tracked by the first dual detector unit reference detector portion and the second dual detector unit reference detector portion are positioned an infinite distance from said first and second dual detector unit reference detector portions.

10. The infrared ranging system defined in claim 7 wherein the reference point energy source tracked by the first dual detector unit reference detector portion corresponds to the reference point energy source tracked by the second dual detector unit reference detector portion, and wherein said reference point energy source is positioned an infinite distance from said first and second dual detector unit reference detector portions.

References Cited in the file of this patent

UNITED STATES PATENTS

| | | |
|---|---|---|
| 2,070,178 | Pottenger | Feb. 9, 1937 |
| 2,262,942 | Jones | Nov. 18, 1941 |
| 2,569,328 | Amberg | Sept. 25, 1951 |